United States Patent
Masui et al.

(10) Patent No.: US 7,838,060 B2
(45) Date of Patent: Nov. 23, 2010

(54) FAT COMPOSITION

(75) Inventors: Kenji Masui, Tokyo (JP); Hidekazu Takahashi, Tokyo (JP)

(73) Assignee: Kao Corporation, Tokyo (JP)

( * ) Notice: Subject to any disclaimer, the term of this patent is extended or adjusted under 35 U.S.C. 154(b) by 914 days.

(21) Appl. No.: 11/587,757

(22) PCT Filed: Apr. 27, 2005

(86) PCT No.: PCT/JP2005/008456

§ 371 (c)(1),
(2), (4) Date: Mar. 23, 2007

(87) PCT Pub. No.: WO2005/104863

PCT Pub. Date: Nov. 10, 2005

(65) Prior Publication Data

US 2008/0064750 A1    Mar. 13, 2008

(30) Foreign Application Priority Data

Apr. 28, 2004   (JP)   ............... 2004-134347

(51) Int. Cl.
*A23D 9/007* (2006.01)
(52) U.S. Cl. ...................... 426/611; 426/601
(58) Field of Classification Search .......... 426/601–611
See application file for complete search history.

(56) References Cited

U.S. PATENT DOCUMENTS

| | | | | |
|---|---|---|---|---|
| 4,656,045 A | * | 4/1987 | Bodor et al. | 426/601 |
| 5,879,735 A | * | 3/1999 | Cain et al. | 426/603 |
| 5,912,042 A | * | 6/1999 | Cain et al. | 426/607 |
| 6,106,879 A | * | 8/2000 | Mori et al. | 426/438 |
| 6,495,536 B1 | * | 12/2002 | Masui et al. | 514/182 |

FOREIGN PATENT DOCUMENTS

| | | |
|---|---|---|
| EP | 0 744 899 | 12/1996 |
| EP | 0 990 391 A1 | 4/2000 |
| JP | 61-063242 | 4/1986 |
| JP | 63-301743 | 12/1988 |
| JP | 63-301765 | 12/1988 |
| JP | 4-300826 | 10/1992 |
| JP | 10 176181 | 6/1998 |
| JP | 10-176181 | 6/1998 |
| JP | 2001-64671 | 3/2001 |
| JP | 2001 64671 | 3/2001 |
| JP | 2001-61411 | 5/2001 |
| JP | 2001-139983 | 5/2001 |
| JP | 2001 139983 | 5/2001 |
| WO | WO 91/09533 | 7/1991 |
| WO | 95/22256 | 8/1995 |
| WO | 95/22257 | 8/1995 |
| WO | 96/32022 | 10/1996 |
| WO | 99/48378 | 9/1999 |
| WO | WO 03/024237 A1 | 3/2003 |

OTHER PUBLICATIONS

Hui, Y. H., editor. 1996. Bailey's Industrial Oil and Fat Products, 5th edition, vol. 2. John Wiley & Sons, Inc., New York. p. 44-46 & 501.*
Michael Bockisch, "Nahrungsfette und -öle", XP002533597, Ulmer, Stuttgart, 1993, pp. 88, 211, 215, 218 and 220.
Alice H. Lichtenstein, et al. "Effects of Different Forms of Dietary Hydrogenated Fats on Serum Lipoprotein Cholesterol Levels", vol. 340, No. 25, Jun. 24, 1999.

* cited by examiner

*Primary Examiner*—Carolyn A Paden
(74) *Attorney, Agent, or Firm*—Oblon, Spivak, McClelland, Maier & Neustadt, L.L.P.

(57) ABSTRACT

The invention provides a fat and oil composition which contains diacylglycerol at a high concentration recognized to have an action of suppressing the accumulation of body fat, has a low content of trans-unsaturated fatty acid having a risk of exerting an adverse influence on diseases in circulatory organs, and is used in bakery products. The invention relates to a fat and oil composition containing 60 to 80 wt % diacylglycerol in fats and oils, wherein 90 wt % or more of fatty acids constituting the diacylglycerol are unsaturated fatty acids, and, in triacylglycerol as the balance, tri-saturated triacylglycerol whose every constituent fatty acid is a saturated fatty acid accounts for 45 to 75 wt % and tri-unsaturated triacylglycerol whose every constituent fatty acid is an unsaturated fatty acid accounts for 10 to 50 wt %, and the content of trans-unsaturated fatty acids in total fatty acids constituting the fats and oils is 5 wt % or less.

6 Claims, No Drawings

FAT COMPOSITION

TECHNICAL FIELD

The present invention relates to a fat and oil composition containing diacyl glycerol at a high concentration, which is used as shortening or margarine in the fields of confectionery and bakery.

BACKGROUND OF THE INVENTION

As the people's concern over health is increasing, there is worry about the influence of trans fatty acids on health (Alice, H. Lichtenstein, et al., EFFECT OF DIFFERENT FORMS OF DIETARY HYDROGENATED FATS ON SERUM LIPOPROTEIN CHOLESTEROL LEVELS, "The New England Journal of Medicine", USA, the Massachusetts Medical Society, 1999, Vol. 340, No. 25, pp. 1933-1940), and there is a tendency to refrain from its ingestion.

On one hand, it has been revealed that diacylglycerol has a function of suppressing the accumulation of body fat (JP-A 4-300826). For ingestion of an effective amount of diacylglycerol in a wide variety of daily consumed fat and oil processed products and in various foods containing them, fat and oil processed food containing diacyl glycerol at a high concentration should be consumed. A fat and oil composition containing diacylglycerol in oil is proposed in, for example, JP-A 63-301765. An invention described in JP-A 63-301765 includes adding a wide variety of partially hydrogenated oils as solid fat to diacylglycerol having a melting point of less than 20° C. which is liquid at ordinary temperature, to give a highly foaming fat and oil composition. However, diacylglycerol is a liquid, and thus commercial products such as butter cream, etc. requiring shape retention at an ordinary temperature should be blended with a large amount of partially hydrogenated oils, and cannot be blended with a large amount of diacylglycerol enough to exhibit its health function sufficiently. The partially hydrogenated oils contain a large amount of trans-unsaturated fatty acid, so its influence on life style-related diseases is concerning, but when the trans-unsaturated fatty acid is reduced, there is a problem that shortening, margarine, etc. hardly attain satisfactory foaming properties and shape retention.

As fat and oil compositions containing diacylglycerol and triacylglycerol, various combinations are proposed not only in JP-A 63-301765 supra but also in JP-A 61-63242, WO-A 95/22256, WO-A 95/22257, WO-A 96/32022 or WO-A 99/48378, JP-A 2001-61411, JP-A 63-301743, JP-A 10-176181 and JP-A 2001-64671.

SUMMARY OF THE INVENTION

The fat and oil compositions in any of the above-mentioned references, when viewed as fats and oils applied to shortening, margarine, etc., cannot be said to satisfy all requirements.

That is, shortening, margarine, etc. are required to have suitable consistency, dissolution in the mouth, workability in the production of dough, releasability from a mold, heat resistance, shape retention, plasticity, and other specific melting behaviors, and also desired to be excellent in shortening properties, foaming properties, liquid sugar syrup absorption, oxidation stability, and miscibility with various food materials, but there is no proposed composition having these requirements in good balance, containing diacylglycerol at a high concentration recognized to have an action of suppressing the accumulation of body fat, having a low content of trans-unsaturated fatty acid having a risk of exerting an adverse influence on diseases in circulatory organs, and being beneficial to the prevention of life style-related diseases.

The present invention provides a fat and oil composition containing diacylglycerol at a high concentration recognized to have an action of suppressing the accumulation of body fat, having a low content of trans-unsaturated fatty acid having a risk of exerting an adverse influence on diseases in circulatory organs, having excellent foaming properties, liquid sugar syrup absorption, shortening properties, miscibility with various food materials, releasability, heat resistance, oxidation stability, shape retention, suitable consistency, dissolution in the mouth, plasticity, and other specific melting behaviors in good balance, and being usable preferably as shortening or margarine in the field of confectionery and bakery.

The present inventors made examination for achieving the above object, and as a result they found that a combination of diacyl glycerol and specific triacylglycerol, wherein 90 wt % or more of constituent fatty acids of the diacylglycerol are unsaturated fatty acids, is extremely effective, thus completing the present invention.

The present invention provides a fat and oil composition containing 60 to 80 weight % diacylglycerol in fats and oils, wherein 90 wt % or more of fatty acids constituting the diacylglycerol are unsaturated fatty acids, and, in triacylglycerol as the balance, tri-saturated triacylglycerol whose every constituent fatty acid is a saturated fatty acid accounts for 45 to 75 weight % and tri-unsaturated triacylglycerol whose every constituent fatty acid is an unsaturated fatty acid accounts for 10 to 50 wt %, and the content of trans-unsaturated fatty acids in total fatty acids constituting the fats and oils is 5 weight % or less.

DETAILED DESCRIPTION OF THE INVENTION

The fat and oil composition of the present invention contains diacylglycerol at a high concentration thereby exhibiting an action of suppressing the accumulation of body fat, has a low content of trans-unsaturated fatty acids thereby exhibiting an effect of suppressing diseases in the circulatory system, has excellent foaming properties, liquid sugar syrup absorption, shortening properties, miscibility, oxidation stability, shape retention, suitable consistency, dissolution in the mouth, plasticity, and other specific melting behaviors in good balance, and can be used preferably as shortening or margarine in the field of confectionery and bakery.

The fat and oil composition of the present invention contains diacylglycerol in an amount of preferably 60 to 80 wt % (hereinafter referred to simply as %), more preferably 62 to 78%, even more preferably 64 to 76%, even more preferably 66 to 74%, from the viewpoint of the suppressing effect on the accumulation of body fat, workability in preparation of the dough, and balance among foaming properties, liquid sugar syrup absorption, miscibility with various food materials (hereinafter referred to simply as miscibility), heat resistance, releasability, etc. The content of diacylglycerol in the fat and oil composition is preferably 60% or more from the viewpoint of the physiological effect, or preferably 80% or less from the viewpoint of the necessity for incorporation of solid fat for plasticity and shape retention.

In a mode of the present invention, the content of unsaturated fatty acids in the fatty acids constituting diacylglycerol is preferably 90% or more, more preferably 93 to 100%, even more preferably 93 to 98%, even more preferably 94 to 98%, from the viewpoint of the physiological effect, miscibility, shape retention, melting properties, and industrial productivity of fats and oils. The number of carbon atoms in the unsaturated fatty acid is preferably 14 to 24, more preferably 16 to 22, from the viewpoint of the physiological effect.

In a mode of the present invention, the content of oleic acid in the fatty acids constituting diacyl glycerol is preferably 20 to 65%, more preferably 25 to 60%, even more preferably 30 to 50%, even more preferably 30 to 45%, from the viewpoint of miscibility, shape retention, melting properties, physiological effect and oxidation stability. From the same viewpoint, the content of olein-olein diacylglycerol is preferably less than 45%, more preferably 0 to 40%.

In a mode of the present invention, the content of linolic acid in the fatty acids constituting diacylglycerol is preferably 15 to 65%, more preferably 20 to 60%, even more preferably 30 to 55%, even more preferably 35 to 50%, from the viewpoint of miscibility, shape retention, melting properties, physiological effect and oxidation stability. From the viewpoint of oxidation stability, miscibility, shape retention and physiological effect, the linolic acid/oleic acid ratio by weight is 0.01 to 2, preferably 0.1 to 1.8, more preferably 0.3 to 1.7. Particularly, the linolic acid/oleic acid ratio by weight is 2 or less in consideration of the influence on health or 0.01 or more from the viewpoint of ingestion of the essential fatty acid.

In a mode of the present invention, the content of linolenic acid in the fatty acids constituting diacylglycerol is preferably less than 15%, more preferably 0 to 13%, even more preferably 1 to 10%, even more preferably 2 to 9%, from the viewpoint of oxidation stability, shape retention, melting properties, physiological effect and miscibility. As linolenic acid, there are known α-linolenic and γ-linolenic acid as isomers, among which α-linolenic acid is preferable in respect of the physiological effect.

In a mode of the present invention, the content of saturated fatty acids in the fatty acids constituting diacylglycerol is preferably 0 to 10%, more preferably 0 to 7%, even more preferably 2 to 7%, even more preferably 2 to 6%, from the viewpoint of miscibility, shape retention, plasticity, dissolution in the mouth, melting properties, physiological effect, and industrial productivity of fats and oils. The saturated fatty acid is preferably a fatty acid containing 14 to 24 carbon atoms, more preferably 16 to 22 carbon atoms, and is even more preferably palmitic acid or stearic acid.

In a mode of the present invention, the content of C12 or less fatty acids in the fatty acids constituting diacylglycerol is preferably 5% or less, more preferably 0 to 2%, even more preferably 0 to 1%, even more preferably substantially null, from the viewpoint of flavor. The remainder of the constituent fatty acids is preferably a fatty acid containing 14 to 24 carbon atoms, preferably 16 to 22 carbon atoms.

In a mode of the present invention, diacylglycerol wherein 1,3-diacylglycerol accounts for 50% or more, preferably 52 to 100%, more preferably 54 to 90%, even more preferably 56 to 80% is preferably used from the viewpoint of the physiological effect, plasticity, shape retention, melting properties, and industrial productivity of fats and oils.

In a mode of the present invention, the proportion of 1,2 (2,3)-diacylglycerol in the fat and oil composition is preferably 30% or less, more preferably 0 to 25%, more preferably 5 to 25%, even more preferably 10 to 20%, from the viewpoint of plasticity, shape retention, melting properties, physiological effect, and industrial productivity of fats and oils.

In a mode of the present invention, the diacylglycerol is produced preferably by using, as the starting material, fats and oils whose constituent fatty acid residues contain a large amount of unsaturated fatty acid residues, for example, vegetable fats and oils such as rapeseed oil, soybean oil, sunflower oil, safflower oil, olive oil, cottonseed oil, corn oil, palm oil, etc. or animal fats and oils such as lard, tallow, butter, etc. Specifically, these fats and oils are subjected to methods such as fractionation, mixing, ester exchange, etc. so as to have a desired fatty acid composition. Then, the fats and oils are mixed with glycerin and subjected to an ester exchange reaction in the presence of a catalyst, or more preferably the fats and oils are previously hydrolyzed in conventional methods, and the resulting fatty acids are subjected to procedures such as wintering, fractionation, distillation, etc. in conventional methods to reduce saturated fatty acids, then mixed with glycerin, and subjected to an esterification reaction in the presence of a catalyst, whereby the diacylglycerol can be obtained. Preferably, the esterification reaction is carried out under enzymatically mild conditions with 1,3-positions-selective lipase or the like, to attain excellent flavor, etc.

For the purpose of the present invention, the diacylglycerol used is also the one with a minimum content of trans-unsaturated fatty acids, and for this minimum content, heating history is preferably minimized in the production process. Specifically, the ester exchange reaction between the fats and oils and glycerin, the hydrolysis reaction of the fats and oils, or the esterification reaction of the fats and oils with glycerin is conducted preferably by using an enzyme reaction with a lipase or the like as the catalyst.

In a mode of the present invention, the content of trans-unsaturated fatty acids in the fatty acids constituting diacylglycerol is preferably 0 to 5%, more preferably 0.1 to 4.5%, even more preferably 0.2 to 4.1%, even more preferably 0.5 to 3.5%, from the viewpoint of flavor, physiological effect, and industrial productivity of fats and oils.

The fat and oil composition of the present invention preferably contains triacylglycerol (TAG) in an amount of 20 to 40%, preferably 22 to 380, more preferably 24 to 36%, even more preferably 24.3 to 33.85%, from the viewpoint of plasticity, shape retention, miscibility, melting properties, dissolution in the mouth, physiological effect, and industrial productivity of fats and oils.

In a mode of the present invention, the triacylglycerol portion in fats and oils is preferably solid fat in order to exhibit the foaming properties and shape retention of the fat and oil composition at ordinary temperature. Although it is possible to employ, as the starting material, fats and oils having a high content of saturated fatty acids, prepared by fractionation, etc. of fats and oils containing a large amount of saturated fatty acids, such as palm oil, lard, tallow, etc., the starting material is preferably fats and oils in which tri-saturated triacylglycerol (SSS-TG) whose every constituent fatty acid is a saturated fatty acid is contained in a specific ratio.

In a mode of the present invention, the content of tri-saturated triacylglycerol (SSS-TG) whose every constituent fatty acid is a saturated fatty acid, in the triacylglycerol, is preferably 45 to 75%, more preferably 48 to 70%, even more preferably 50 to 65%, even more preferably 54 to 60%, from the viewpoint of melting properties, foaming properties, liquid sugar syrup absorption, dissolution in the mouth, plasticity, shape retention, and heat resistance. Particularly, the content of SSS-TG in the triacylglycerol is preferably 45% or more from the viewpoint of the retention of bubbles and the stabilization of gas/fat and oil interface, or preferably not greater than 75% from the viewpoint of dissolution in the mouth and plasticity.

In a mode of the present invention, the content of tri-unsaturated triacylglycerol (UUU-TG) whose every constituent fatty acid is an unsaturated fatty acid, in the triacylglycerol, is preferably 10 to 50%, more preferably 10 to 45%, even more preferably 20 to 42%, even more preferably 30 to 40%, from the viewpoint of miscibility, foaming properties, liquid sugar syrup absorption, dissolution in the mouth, plasticity, heat resistance and melting properties.

The balance is di-saturated mono-unsaturated triacylglycerol ($S_2$U-TG) and mono-saturated di-unsaturated triacylglycerol ($SU_2$-TG) In a mode of the present invention, the content of $S_2$U-TG and $SU_2$-TG in the triacyl glycerol is preferably 0 to 45%, more preferably 0 to 22%, even more preferably 1 to 10%, even more preferably 2 to 5%, from the viewpoint of plasticity, shape retention, dissolution in the mouth, foaming properties and melting properties.

In a mode of the present invention, it is preferable that while the requirements described above are satisfied, the content of unsaturated fatty acids in the fatty acids constituting triacylglycerol is preferably 25 to 55%, more preferably 27 to 50%, even more preferably 30 to 45%, even more preferably 34 to 42%, from the viewpoint of miscibility, foaming properties, liquid sugar syrup absorption, dissolution in the mouth, plasticity and melting properties.

In a mode of the present invention, unsaturated fatty acids constituting the triacylglycerol are preferably those containing 14 to 24 carbon atoms, more preferably 16 to 22 carbon atoms, even more preferably oleic acid, linolic acid, linolenic acid, gadoleic acid and erucic acid, among which oleic acid, linolic acid and linolenic acid are preferable.

In a mode of the present invention, the content of oleic acid in the fatty acids constituting triacylglycerol is preferably 5 to 30%, more preferably 10 to 20%, even more preferably 12 to 18%, from the viewpoint of shape retention, plasticity, melting properties, dissolution in the mouth, miscibility, and foaming properties.

In a mode of the present invention, the content of linolic acid in the fatty acids constituting triacylglycerol is preferably 5 to 30%, more preferably 10 to 25%, even more preferably 12 to 22%, from the viewpoint of balance among fatty acids ingested, oxidation stability, shape retention, plasticity, melting properties, dissolution in the mouth, miscibility, and foaming properties.

In a mode of the present invention, the content of linolenic acid in the fatty acids constituting triacylglycerol is preferably 0.1 to 10%, more preferably 1 to 8%, even more preferably 2 to 5%, from the viewpoint of balance among fatty acids ingested, oxidation stability, shape retention, plasticity, melting properties, dissolution in the mouth, miscibility, and foaming properties. Linolenic acid is preferably α-linolenic acid.

In a mode of the present invention, saturated fatty acids constituting the triacyl glycerol are preferably those containing 14 to 24 carbon atoms, more preferably 16 to 22 carbon atoms, even more preferably palmitic acid, stearic acid, arachidonic acid and behenic acid, among which palmitic acid and stearic acid are preferable.

In a mode of the present invention, the content of palmitic acid (C16:0) in the fatty acids constituting triacylglycerol is preferably 1 to 45%, more preferably 3 to 35%, even more preferably 7 to 30%, from the viewpoint of shape retention, plasticity, melting properties, dissolution in the mouth, miscibility, and foaming properties.

In a mode of the present invention, the content of stearic acid (C18:0) in the fatty acids constituting triacylglycerol is preferably 10 to 69%, more preferably 20 to 65%, even more preferably 30 to 60%, from the viewpoint of shape retention, plasticity, melting properties, dissolution in the mouth, miscibility, and foaming properties.

In a mode of the present invention, the content of arachidonic acid (C20:0) in the fatty acids constituting triacylglycerol is preferably 5% or less, more preferably 0 to 3%, even more preferably 0.1 to 1%, from the viewpoint of dissolution in the mouth, shape retention and plasticity.

In a mode of the present invention, the content of behenic acid (C22:0) in the fatty acids constituting triacylglycerol is preferably 3% or less, more preferably 0 to 2%, even more preferably 0 to 1%, from the viewpoint of dissolution in the mouth, shape retention, and plasticity.

Fats and oils containing tri-saturated triacylglycerol at a high concentration are obtained by fully hydrogenating various vegetable oils and animal oils to an iodine value of preferably 5 or less, more preferably 0 to 2, and for example fully hydrogenated soybean fats and oils, fully hydrogenated rapeseed fats and oils and fully hydrogenated palm fats and oils can be used. By full hydrogenation, trans-unsaturated fatty acids contained in usual partially hydrogenated oils can be minimized, which is preferable in preventing diseases in circulatory organs.

In the fat and oil composition of the present invention, it is also possible to use a mixture wherein the above fully hydrogenated oils and usual vegetable or animal oils are mixed in such a range as to satisfy requirements such as the content of tri-saturated triacylglycerol, etc. In this case too, use of partially hydrogenated oils as simultaneously used vegetable or animal oils is preferably avoided from the viewpoint of preventing diseases in circulatory organs.

In an even more preferable mode of the present invention, the triacylglycerol consists of a mixture of rapeseed oil or soybean oil and an fully hydrogenated oil of vegetable oil.

The fat and oil composition of the invention contains the specific diacylglycerol and the specific triacylglycerol, wherein the content of trans-unsaturated fatty acids in the whole fatty acids constituting fats and oils is preferably 5% or less, more preferably 0 to 4.5%, even more preferably 0.1 to 4.1%, even more preferably 0.2 to 3.5%, from the viewpoint of preventing diseases in circulatory organs, industrial productivity of fats and oils, and flavor.

In a mode of the present invention, the trans-unsaturated fatty acid refers to an unsaturated fatty acid whose one or more double bonds are trans-forms. The method of quantifying the trans-unsaturated fatty acid in the present invention was carried out according to American Oil Chemists, Society Official Method Ce 1f-96 (GLC method).

The content of monoacylglycerol (MAG) in the fat and oil composition of the present invention is preferably 10% or less, more preferably 0 to 5%, even more preferably 0 to 2%, even more preferably 0.1 to 1.5%, from the viewpoint of flavor, outward appearance, emulsification properties, smoke production, and industrial productivity of fats and oils. From the viewpoint of industrial productivity of fats and oils, the fatty acids constituting monoacylglycerol are preferably the same as the fatty acids constituting diacylglycerol.

In the fat and oil composition of the present invention, free fatty acids or salts thereof (FFAs) are reduced to preferably 3.5% or less, more preferably 0 to 1%, even more preferably 0 to 0.5%, even more preferably 0.05 to 0.2%, from the viewpoint of flavor, emulsification properties, smoke production, and industrial productivity of fats and oils.

The content of fatty acid having 4 or more carbon-carbon double bonds in all the fatty acids constituting the fat and oil composition of the present invention is preferably 0 to 40%, more preferably 0 to 20%, even more preferably 0 to 10%, even more preferably 0 to 1%, even more preferably substantially null from the viewpoint of oxidation stability, processability in production of dough, physiological effect, coloration, etc.

The solid fat content (SFC) of the fat and oil composition of the present invention is preferably 0 to 10 at 35° C., 5 to 30 at 25° C., 10 to 35 at 15° C., or 15 to 40 at 5° C., more preferably 1 to 5 at 35° C., 10 to 25 at 25° C., 15 to 30 preferably 12 to 30 at 15° C., 20 to 35 preferably 12 to 35 at 5° C., from the viewpoint of dissolution in the mouth, shape retention, plasticity, spreadability, etc.

Addition of a phytosterol component to the fat and oil composition of the present invention is preferable with respect to a blood cholesterol reduction effect, reduction of saturated acid, and processability into butter cream or bakery products. Particularly in the present invention, a phytosterol is easily dissolved in a high conc. diacylglycerol, so even if the phytosterol is crystallized in diacylglycerol, the crystals are finer than in triacylglycerol, and thus there is an advantage of less influence on foaming properties, liquid sugar syrup absorption, and dissolution in the mouth.

In a mode of the present invention, the phytosterol includes phytostanol and includes, for example, free forms of α-sitosterol, β-sitosterol, stigmasterol, 7-stigmastenol, campesterol, brassicasterol, isofucosterol, α-sitostanol, β-sitostanol, stigmastanol, 7-stigmastanol, campestanol, brassicastanol, isofucostanol, cycloartenol, cholesterol, avenasterol, etc., as well as esters thereof such as fatty acid esters, ferulic acid esters, succinic acid esters, etc.

The phytosterol fatty acid esters also include phytostanol fatty acid esters and include, example, α-sitosterol fatty acid ester, β-sitosterol fatty acid ester, stigmasterol fatty acid ester, 7-stigmastenol fatty acid ester, campesterol fatty acid ester, brassicasterol fatty acid ester, isofucosterol fatty acid ester, α-sitostanol fatty acid ester, β-sitostanol fatty acid ester, stigmastanol fatty acid ester, 7-stigmastanol fatty acid ester, campestanol fatty acid ester, brassicastanol fatty acid ester, isofucostanol fatty acid ester, cycloartenol fatty acid ester, cholesterol fatty acid ester, avenasterol fatty acid ester, etc.

In a mode of the present invention, brassicasterol, campesterol, stigmasterol, β-sitosterol, and fatty acid esters thereof among these phytosterols are preferable from the viewpoint of industrial productivity of fats and oils, flavor, etc. The total content of brassicasterol, campesterol, stigmasterol and β-sitosterol in the phytosterol, in terms of the phytosterol free form, is preferably 90% or more, more preferably 92 to 100%, even more preferably 94 to 99%, from the viewpoint of flavor, industrial productivity of fats and oils, crystal precipitation, and physiological effect.

In a mode of the present invention, the content of brassicasterol in the phytosterol, in terms of the phytosterol free form, is preferably 0.5 to 15%, more preferably 0.7 to 11%, even more preferably 3 to 10%, from the viewpoint of flavor, industrial productivity of fats and oils, crystal precipitation, and physiological effect.

In a mode of the present invention, the content of campesterol in the phytosterol, in terms of the phytosterol free form, is preferably 10 to 40%, more preferably 20 to 35%, even more preferably 23 to 29%, from the viewpoint of flavor, industrial productivity of fats and oils, crystal precipitation, and physiological effect.

In a mode of the present invention, the content of stigmasterol in the phytosterol, in terms of phytosterol free form, is preferably 3 to 30%, more preferably 11 to 25%, even more preferably 17 to 24%, from the viewpoint of flavor, industrial productivity of fats and oils, crystal precipitation, and physiological effect.

In a mode of the present invention, the content of β-sitosterol in the phytosterol, in terms of the phytosterol free form, is preferably 20 to 60%, more preferably 30 to 56%, even more preferably 42 to 51%, from the viewpoint of flavor, industrial productivity of fats and oils, crystal precipitation, and physiological effect.

In a mode of the present invention, the content of cholesterol in the phytosterol is preferably 1% or less, more preferably 0.01 to 0.8%, even more preferably 0.1 to 0.7%, even more preferably 0.2 to 0.6%, from the viewpoint of reduction in blood cholesterol and industrial productivity of fats and oils.

In a mode of the present invention, the content of unsaturated fatty acids in fatty acids constituting the phytosterol fatty acid ester is preferably 80% or more, more preferably 85 to 100%, even more preferably 86 to 98%, even more preferably 88 to 93%, from the viewpoint of flavor, crystal precipitation, industrial productivity of fats and oils, oxidation stability, and physiological effect.

In a mode of the present invention, the content of the phytosterol based on 100 parts by weight of the fat and oil composition is preferably 0.05 to 20 parts by weight, more preferably 0.3 to 15 parts by weight, even more preferably 0.5 to 10 parts by weight, even more preferably 1 to 5 parts by weight, even more preferably 1 to 4.7 parts by weight, even more preferably 2 to 4.7 parts by weight, from the viewpoint of satisfying both reduction in blood cholesterol and processability into butter cream and bakery products.

The fat and oil composition of the present invention may be blended with components contained in usual fat and oil compositions, for example, antioxidants such as vitamin E (tocopherol), vitamin C or derivatives thereof (ascorbic acid palmitate, ascorbic acid stearate), butyl hydroxyl toluene (BHT), butyl hydroxyl anisole (BHA), tert-butyl hydroquinone (TBHQ), etc.

In a mode of the present invention, the content of the antioxidant based on 100 parts by weight of the fat and oil composition is preferably 0.005 to 0.5 parts by weight, more preferably 0.04 to 0.25 parts by weight, even more preferably 0.08 to 0.2 part by weight, from the viewpoint of flavor, oxidation stability, coloration, etc.

In a mode of the present invention, α-, β-, γ-, and δ-tocopherol or a mixture thereof can be used as vitamin B. Particularly, δ-tocopherol is preferable from the viewpoint of oxidation stability. Commercial products of vitamin E include Emix D, Emix 80 (manufactured by Eisai Co., Ltd.), MDE-6000 (manufactured by Yashiro Co., Ltd.), E-Oil-400 (manufactured by Riken Vitamin Co., Ltd.), etc. In the present invention, the content of tocopherol as vitamin E is preferably 0.01 to 0.5 part by weight, more preferably 0.02 to 0.3 part by weight, even more preferably 0.05 to 0.2 part by weight, based on 100 parts by weight of the fat and oil composition.

The content of ascorbic acid as vitamin C or its derivative in the fat and oil composition of the present invention is preferably 0.004 to 0.1 part by weight, more preferably 0.006 to 0.08 part by weight, even more preferably 0.008 to 0.06 part by weight, based on 100 parts by weight of the fat and oil composition.

When the fat and oil composition of the present invention is mixed with water or used in a water-containing food and stored for a long time or in a bright place, it is preferable for the composition to be substantially free from L-ascorbic acid fatty acid ester as the antioxidant and to use vitamin E, preferably δ-tocopherol, in order to prevent deterioration in flavor and generation of a nasty taste.

In the fat and oil composition of the present invention, a C2 to C8 organic carboxylic acid is preferably added. The content of the C2 to C8 organic carboxylic acid is preferably 0.001 to 0.01 part by weight, more preferably 0.0012 to 0.007, even more preferably 0.0015 to 0.0045 part by weight, even more preferably 0.0025 to 0.0034 part by weight, based on 100 parts by weight of the fat and oil composition, from the viewpoint of flavor, outward appearance and oxidation stability.

The fat and oil composition of the present invention may be blended if necessary with an emulsifying agent. The emulsifying agent that can be used includes lecithin, enzymatically modified lecithin, glycerin monofatty acid ester, glycerin lactic acid fatty acid ester, glycerin succinic acid fatty acid ester, glycerin acetic acid fatty acid ester, glycerin diacetyl tartaric acid fatty acid ester, sorbitan fatty acid ester, sorbitol fatty acid ester, polyoxyethylene sorbitan fatty acid ester, sucrose fatty acid ester, polyglycerin fatty acid ester, polyglycerin condensed ricinoleic acid ester, propylene glycol fatty acid ester, sodium stearoyl lactate, calcium stearoyl lactate, etc., and one or more members selected therefrom can be used.

The HLB value of the emulsifying agent is preferably 0 to 20, more preferably 1 to 16, even more preferably 7 to 15.

The fat and oil composition of the present invention is excellent in functions such as miscibility, liquid sugar syrup absorption, etc., and thus an emulsifying agent is often not required to be added, or when added, may be added in a small amount, so the fat and oil composition is also excellent in respect of flavor and cost.

The content of the emulsifying agent is preferably 0.01 to 8 parts by weight, more preferably 0.02 to 5 parts by weight, even more preferably 0.05 to 2 parts by weight, even more preferably 0.07 to 1.5 parts by weight, based on 100 parts by weight of the fat and oil composition, from the viewpoint of emulsifying properties, demulsifying properties, miscibility, liquid sugar syrup absorption, flavor, and foaming properties.

Particularly, when the fat and oil composition of the present invention is used as creaming shortening or as a water-in-oil emulsion, lecithin is incorporated in an amount of preferably 0.02 to 0.2 part by weight, more preferably 0.05 to 0.15 part by weight, based on 100 parts by weight of the fat and oil composition, in order to improve liquid sugar syrup absorption significantly.

If necessary, the fat and oil composition of the present invention can make use of a coloring agent such as β-carotene or annatto extract, a flavor, a seasoning, etc.

The fat and oil composition of the present invention can be used as shortening, an emulsion or a dispersion. Specifically, the shortening, emulsion or dispersion using the fat and oil composition of the present invention can be utilized in various foods such as cake, bread, sweet roll, pie, cracker, cookie, biscuit, waffle, scone, pastry puff, Danish, donut, fried food, fried side dish, etc.

If necessary, the above components are added to, and mixed with, the fat and oil composition of the present invention, and kneaded, while being rapidly cooled, in conventional methods, and then subjected to tempering (20 to 30° C., 24 to 72 hours), whereby shortening can be produced. When shortening is produced, it is preferable that a gas is dispersed in the fat and oil composition. The gas includes nitrogen, air, etc., among which nitrogen is preferable.

From the viewpoint of plasticity, the content of the gas is preferably 0.1 to 20 mL, more preferably 1 to 18 mL, even more preferably 4 to 15 mL, even more preferably 7 to 13 mL, per 100 g of the fat and oil composition.

The fat and oil composition of the present invention can also be preferably used as shortening. The shortening includes fry shortening used in fried food such as donuts, spray shortening used in crackers or snacks, shortening as a substitute for cacao used in chocolate coating, general-purpose shortening used in various applications, and creaming shortening used in icing and butter cream.

The fat and oil composition of the present invention can also be used in an oil-in-water emulsion such as a water-in-oil emulsion or a water-in-oil dispersion, in an oil-in-water emulsion, and in an oil-in-water-in-oil bilayer emulsion, and is used preferably in a water-in-oil emulsion. The aqueous phase/oil phase ratio by weight is preferably 90/10 to 15/85, more preferably 85/15 to 30/70, even more preferably 80/20 to 50/50.

In a mode of the present invention, the water-in-oil composition preferably contains sugars. The sugars used include monosaccharides, disaccharides, trisacchrides, tetrasacchrides, pentasaccharides and hexasaccharides such as glucose, maltose, fructose, sucrose, lactose, trehalose, maltotriose, maltotetraose, sorbitol, xylitol, erythritol, maltitol, etc., starch hydrolysates, and sugar alcohols obtained by reducing the above, mixtures thereof, and various starch syrups.

In a mode of the present invention, the content of sugars in the water-in-oil composition is preferably 10 to 85%, more preferably 15 to 70%, even more preferably 20 to 50%, from the viewpoint of sweetness and preservation. The content of sugars in the aqueous phase is preferably 35 to 100%, more preferably 45 to 85%, even more preferably 50 to 75%, from the viewpoint of sweetness and preservation.

In a mode of the present invention, it is possible to employ egg protein, soybean protein, milk protein, and proteins separated from these proteins, various proteins such as (partially) decomposed products of these proteins in addition to the above-mentioned emulsifying agent, flavor, antioxidant, coloring agent and sugars. Further, tasting agents such as common salt, phosphoric acid, citric acid, juices, fruits, vegetables, etc., perfumes such as spices, flavors, etc., stabilizers such as thickening polysaccharides and starch, preservatives, water, etc. can be used.

In a mode of the present invention, the water-in-oil composition can be produced by mixing the fat and oil composition with an aqueous phase and emulsifying or dispersing the mixture. After emulsification or dispersion, the resulting composition is preferably sterilized. The method of sterilization can be exemplified by a batch or continuous system, and continuous sterilization using a scraping heat-exchanger or a plate heat-exchanger is preferable. After sterilization, the product is preferably plasticized by cooling. For rapid cooling, a continuous closed tube cooler such as the Votator, the Kombinator or the like is preferably used.

In a mode of the invention, the water-in-oil composition can be used in roll-in type margarine for Danish pastry, spreads such as table margarine and tab margarine, margarine kneaded in bread and confectionery, butter cream, filling cream, topping cream, etc. In the case of filling cream or topping cream, the specific gravity ($g/cm^3$) is preferably 0.3 to 0.9, more preferably 0.5 to 0.85, even more preferably 0.6 to 0.8, from the viewpoint of feel upon eating, dissolution in the mouth, and smoothness.

EXAMPLES

Hereinafter, the Examples are described, but the scope of the invention is not limited to the following examples.

Preparation of Fat and Oil 1 (Fat and Oil with a High Content of Diacylglycerol)

455 parts by weight of soybean oil fatty acids wherein saturated fatty acid had been reduced by wintering, 195 parts by weight of rapeseed oil fatty acids, and 107 parts by weight of glycerin, were esterified by ribozyme IM (manufactured by Novozymes Co., Ltd.) at 0.07 hPa at 40° C. for 5 hours. Then, the enzyme was separated by filtration, and the reaction mixture was subjected to molecular distillation at 235° C., then decolorized and washed with water. Then, 7.5 parts by weight of 10% aqueous citric acid were added to 150 parts by weight of the resulting fat and oil which were then stirred at 60° C. for 20 minutes and then dehydrated at 110° C. The product was deodorized at 235° C. for 2 hours to prepare the fat and oil 1.

The results of analysis by the following methods are shown in Table 1.

TABLE 1

|  | Fat and oil 1 |
|---|---|
| Glyceride composition Wt % | |
| TG | 13.2 |
| DG | 85.9 |
| 1,3DG | 59.3 |
| MG | 0.8 |
| FA | 0.1 |
| Composition of constituent fatty acid Wt % | |
| C16:0 | 3.1 |
| C18:0 | 1.3 |
| C18:1 | |
| cis | 38.0 |
| trans | 0 |
| C18:2 | |
| cis | 46.7 |
| trans | 1.2 |
| C18:3 | |
| cis | 6.1 |
| trans | 2.2 |
| Others | 1.4 |
| Total transUFA | 3.4 |

Analysis Methods (i) Glyceride Composition

A 10 mg sample and 0.5 mL trimethylsilylating agent ("Silylating agent TH", manufactured by Kanto Chemical Co., Inc.) were added to a sample bottle made of glass, sealed and heated at 70° C. for 15 minutes. The product was subjected to gas chromatography (GLC) to analyze its glyceride composition.

GLC Conditions
Unit: 6890 model manufactured by Hewlett Packard
Column: DB-LHT (manufactured by J&W Scientific) 7 m
Column temperature: initial 80° C., final=340° C.
Increasing temperature=10° C./min., kept at 340° C. for 20 minutes
Detection part: FID, temperature=350° C.
Injection part: split ratio=50:1, temperature=320° C.
Sample injection volume: 1 µL
Carrier gas: helium, flow rate=1.0 mL/min.

(ii) Constituent Fatty Acid Composition

Fatty acid methyl ester was prepared according to "Method of Preparing Fatty Acid Methyl Ester (2.4.1.2-1996)" in "Standard Fat and Oil Analysis Test Method" edited by Japan Oil Chemists' Society. The resulting sample was subjected to GLC and analyzed for its constituent fatty acid composition (American Oil Chem. Soc. Official Method: Celf-96, 2002).

Fats and Oils 2 to 5

Fully hydrogenated soybean fat and oil (IV=1.1) was designated fat and oil 2. Fully hydrogenated rapeseed fat and oil (IV=1.2) was designated fat and oil 3. Soybean salad oil was designated fat and oil 4. Partially hydrogenated rapeseed fat and oil (IV=69) was designated fat and oil 5.

Phytosterol

As phytosterol, "Phytosterol F" manufactured by Tama Biochemical Co., Ltd. was used.

Example 1

Preparation of Fat and Oil Compositions (Invented Product Examples (Nos. 1 to 6) and Comparative Products (No. 7 to 13))

Fats and oils 1 to 5 and the phytosterol were mixed in the ratio shown in Table 2 and heated and melted. Then, the respective mixtures were rapidly cooled and kneaded with a chiller (emulsifying kneader, Tama Seiki Kogyo Co., Ltd.). The mixtures were then tempered and stored in a refrigerator (5° C.) to produce fat and oil compositions (invented product examples (Nos. 1 to 6) and comparative products (Nos. 7 to 13)). The analysis values are shown in Table 2.

Using each fat and oil composition, the following foaming test, liquid sugar syrup absorption test, cream heat resistance test, and test for application to bakery product were then conducted.

Example 2

Foaming Test 300 g of each of the fat and oil compositions (invented product examples (Nos. 1 to 6) and comparative products (Nos. 7 to 13)) prepared in Example 1 was foamed by stirring at a middle speed for 20 minutes in a Hobart mixer (N-50, manufactured by Hobart Co.). The volume of the fat and oil composition after foaming per g (specific volume, ml/g) was measured to evaluate foaming properties. The results are shown in Table 2.

The invented product examples, as compared with the comparative products, were revealed to have excellent foaming properties.

Example 3

Liquid Sugar Syrup Absorption Test

While 100 g of fat and oil composition after foaming, prepared in Example 2, was stirred with a Hobart mixer, a syrup (trade name: MC-45, Brix. 70, Nihon Shokuhin Kako Co., Ltd.) was added stepwise in 50-g portions. The amount of the syrup added just before separation of the fat and oil composition from the syrup was measured. From this measurement, the amount (g) of the syrup added per g of the fat and oil composition was determined to evaluate liquid sugar syrup absorption. The results are shown in Table 2.

The invented product examples were revealed to be superior to the comparative products in liquid sugar syrup absorption.

Example 4

Test of Heat Resistance of Cream

While 100 g of a fat and oil composition after foaming, prepared in Example 2, was stirred with a Hobart mixer, the syrup was added just before separation to prepare butter cream. The resulting butter cream charged into a cup, left at 25° C. for 24 hours, and observed for its outward appearance with the naked eye under the following criteria, to evaluate heat resistance. The results are shown in Table 2.

Heat resistance
A: Excellent without oil-off
B: Slightly inferior with slight oil-off on the surface
C: Inferior with complete separation of oil The invented product examples were revealed to be superior to the comparative products in heat resistance.

TABLE 2

| | Invention product Examples | | | | | | Comparative products | | | | | | |
|---|---|---|---|---|---|---|---|---|---|---|---|---|---|
| | No. 1 | No. 2 | No. 3 | No. 4 | No. 5 | No. 6 | No. 7 | No. 8 | No. 9 | No. 10 | No. 11 | No. 12 | No. 13 |
| Fat and oil composition Parts by weight | | | | | | | | | | | | | |
| phytosterol[*1)] | 0 | 0 | 0 | 2 | 5 | 10 | 0 | 0 | 0 | 0 | 0 | 0 | 10 |
| Fat and oil 1 | 80 | 80 | 85 | 85 | 80 | 80 | 0 | 30 | 0 | 60 | 80 | 80 | 0 |
| Fat and oil 2 | 20 | 15 | 0 | 0 | 0 | 0 | 20 | 20 | 0 | 0 | 0 | 0 | 10 |
| Fat and oil 3 | 0 | 0 | 15 | 13 | 15 | 10 | 0 | 0 | 0 | 0 | 0 | 10 | 0 |
| Fat and oil 4 | 0 | 5 | 0 | 0 | 0 | 0 | 80 | 50 | 60 | 0 | 0 | 10 | 80 |
| Fat and oil 5 | 0 | 0 | 0 | 0 | 0 | 0 | 0 | 0 | 40 | 40 | 20 | 0 | 0 |
| Glyceride composition (weight-%) | | | | | | | | | | | | | |
| MG | 1.0 | 1.0 | 1.1 | 1.1 | 1.1 | 1.1 | 0.2 | 0.5 | 0.5 | 1.0 | 1.0 | 1.0 | 0.2 |
| DG | 68.0 | 68.1 | 72.3 | 74.0 | 71.9 | 75.8 | 1.1 | 26.2 | 1.4 | 51.0 | 68.0 | 68.4 | 1.5 |
| TG | 31.0 | 30.9 | 26.6 | 24.9 | 27.0 | 23.1 | 98.7 | 73.3 | 98.1 | 48.0 | 31.0 | 30.6 | 98.3 |
| Composition in TG (weight-%) | | | | | | | | | | | | | |
| SSS-TG | 64.5 | 48.5 | 56.4 | 53.2 | 58.3 | 48.1 | 20.3 | 27.3 | 0.5 | 1.0 | 0.6 | 32.6 | 11.3 |
| UUU-TG | 32.3 | 41.7 | 39.8 | 42.6 | 37.7 | 47.1 | 46.6 | 44.9 | 53.3 | 53.8 | 61.6 | 51.3 | 51.9 |
| Unsaturated fatty acid (UFA) | 33.1 | 46.3 | 40.8 | 46.2 | 41.3 | 51.0 | 64.9 | 59.9 | 80.9 | 83.1 | 85.5 | 61.7 | 75.2 |
| Trans-UFA (weight-%) | 2.8 | 2.9 | 3.0 | 3.0 | 2.8 | 2.8 | 1.6 | 2.1 | 17.6 | 18.5 | 11.0 | 3.0 | 1.6 |
| SFC of fat and oil composition | | | | | | | | | | | | | |
| 5° C. | 20.3 | 16.7 | 16.5 | 14.2 | 16.6 | 16.4 | 20.3 | 20.2 | 26.0 | 25.6 | 12.6 | 11.1 | 18.9 |
| 25° C. | 17.9 | 13.3 | 13.3 | 13.0 | 15.5 | 14.5 | 17.9 | 17.5 | 13.2 | 13.1 | 6.3 | 10.1 | 17.5 |
| Foaming ability | 3.7 | 4 | 4.1 | 4 | 4 | 3.6 | 1.9 | 2.4 | 2.3 | 4 | 2 | 4 | 1.9 |
| Liquid sugar syrup absorption | 4 | 4 | 4 | 4 | 4 | 4 | 2 | 2.5 | 2.5 | 3.5 | 2 | 3 | 2.5 |
| Heat resistance | A | A | A | A | A | A | A | A | B | B | C | C | B |

[*1)]Phytosterol F, Tama Biochemical Co., Ltd.

Example 5

Evaluation of Application to Bakery Product

Using each of the fat and oil compositions (invented product examples (Nos. 1, 2, 5 and 6) and comparative examples (Nos. 7 to 9, 12 and 13) produced in Example 1, dough for short bread was prepared according to the composition in Table 3, then placed in a mold and baked in an oven (160° C., 45 minutes). After baking, the product was removed from the mold to produce short bread.

The processability (miscibility with other starting components, easiness with which dough is kneaded) in preparation of dough, the releasability of the product from the mold after baking (mold releasability), and the flavor and eating feel of the short bread were evaluated under the following criteria. The results are shown in Table 4.

TABLE 3

| Composition | Parts by weight |
|---|---|
| Wheat flour | 250 |
| Fat and oil composition | 100 |
| Whole egg | 50 |
| Sugar | 50 |
| Powdery maltose | 50 |
| Butter | 25 |
| Water | 25 |
| Common salt | 1.5 |

Processability in Preparation of Dough
A: Excellent with soft dough uniformly kneaded with easy miscibility with the other starting components
B: Slightly inferior with slightly rigid dough slightly hardly miscible with the other starting components
C: Inferior with rigid dough hardly miscible with the other starting components, to take a long time in kneading with the other starting components Mold Releasability After Baking
A: Excellent with easy release without adhesion to the mold
B: Slightly inferior with partial adhesion to the mold
C: Inferior with whole adhesion to the mold to require vibration for release Flavor and Eating Feel
A: Excellent with moistening feel with good dissolution in the mouth
B: Slightly inferior with slight gritty and dry feel
C: Inferior with strong gritty and dry feel with poor dissolution in the mouth

TABLE 4

|  | Invention product Examples | | | | Comparative products | | | | |
| --- | --- | --- | --- | --- | --- | --- | --- | --- | --- |
|  | No. 1 | No. 2 | No. 5 | No. 6 | No. 7 | No. 8 | No. 9 | No. 12 | No. 13 |
| Processability in preparation of dough | A | A | A | A | B | B | C | B | C |
| Mold releasability | A | A | A | A | C | B | C | B | C |
| Flavor and texture | A | A | A | A | C | B | B | B | C |

It was found that the invented products, as compared with the comparative products, have excellent processability (processability in preparation of dough, mold releasability after baking, flavor and texture) and are suitable for bakery products. It was further found that by incorporating phytosterol, the physical properties of the resulting shortening, such as foaming properties, liquid sugar syrup absorption, heat resistance, etc. can be maintained even if tri-saturated triacylglycerol is reduced, and the invented products can be expected to have an effect on health functions by reducing saturated fatty acid, together with an effect of reducing the absorption of cholesterols.

Thus, the fat and oil composition as an example of the present invention has excellent processability, foaming properties, liquid sugar syrup absorption, heat resistance, shape retention, plasticity, and other specific melting properties in good balance.

The invention claimed is:

1. A fat and oil composition comprising 60 to 80 wt % diacylglycerol in fats and oils, wherein 90 wt % or more of fatty acids constituting the diacylglycerol are unsaturated fatty acids and, a balance of triacylglycerol, wherein the tri-saturated triacylglycerol whose every constituent fatty acid is a saturated fatty acid accounts for 45 to 75 wt % and tri-unsaturated triacylglycerol whose every constituent fatty acid is an unsaturated fatty acid accounts for 10 to 50 wt %, and the content of trans-unsaturated fatty acids in the total fatty acids constituting the fats and oils is 5 wt % or less.

2. The fat and oil composition according to claim 1, wherein 25 to 55 wt % of fatty acids constituting the triacylglycerol are unsaturated fatty acids.

3. The fat and oil composition according to claim 1 or 2, wherein the triacylglycerol comprises a mixture of rapeseed oil or soybean oil and an fully hydrogenated oil of vegetable oil.

4. The fat and oil composition according to any of claims 1 to 3, which further comprises phytosterol.

5. A shortening comprising a gas in an amount of 0.1 to 20 mL per 100 g of the fat and oil composition according to any of claims 1 to 4.

6. A water-in-oil composition comprising, as an oil phase, the fat and oil composition according to any of claims 1 to 4.

* * * * *